(12) United States Patent
Rogers

(10) Patent No.: US 6,281,938 B1
(45) Date of Patent: Aug. 28, 2001

(54) SIGNAL PROCESSING SYSTEM

(75) Inventor: Simon Darryl Rogers, Twickenham (GB)

(73) Assignee: Quantel Limited, Newbury (GB)

( * ) Notice: Subject to any disclaimer, the term of this patent is extended or adjusted under 35 U.S.C. 154(b) by 0 days.

(21) Appl. No.: 09/028,398

(22) Filed: Feb. 24, 1998

(30) Foreign Application Priority Data

Feb. 27, 1997 (GB) .................................................... 9704059

(51) Int. Cl.[7] .................................. G06K 9/00; G06K 9/36
(52) U.S. Cl. .......................... 348/555; 348/441; 348/453; 382/260; 382/298
(58) Field of Search ..................................... 348/387, 386, 348/441, 444, 447, 453, 458, 580, 571, 911, 555; 382/261, 260, 262, 263, 298, 299, 300, 269; G06K 9/36, 9/00

(56) References Cited

U.S. PATENT DOCUMENTS

| | | | |
|---|---|---|---|
| 4,602,285 | * 7/1986 | Beaulier | 348/580 |
| 5,384,869 | * 1/1995 | Wilkinson | 348/384 |
| 5,528,301 | * 6/1996 | Hau | 348/571 |
| 5,537,157 | * 7/1996 | Washino | 348/911 |
| 5,550,936 | * 8/1996 | Someya | 348/625 |
| 5,852,470 | * 12/1998 | Kondo | 348/488 |
| 5,920,654 | * 7/1999 | Someya | 382/270 |

FOREIGN PATENT DOCUMENTS

| | | |
|---|---|---|
| 469892A3 | 2/1992 | (EP) . |
| 2286943 | 8/1995 | (GB) . |

* cited by examiner

Primary Examiner—Mark R. Powell
Assistant Examiner—Wesner Sajous
(74) Attorney, Agent, or Firm—Cooper & Dunham LLP

(57) ABSTRACT

A signal processing system 20 comprises a source 22 of video signals representing pixels in a first format (e.g. 4:4:4). The video signals are coarsely processed by a filter 43 and interpolator 44 and the processed signals are compared by a comparator 46 with the video signals. Depending on the result of the comparison either signals from the filter 43 or signals from a filter 30 are selected for output as video signals representing the pixels in a second format (e.g. 4:2:2).

15 Claims, 3 Drawing Sheets

SIGNAL PROCESSING SYSTEM

The invention relates to a signal processing system.

Images can be represented in an electrical environment by signals that define such image attributes as the intensity and colour of elements of the images. In the past, television pictures were represented by analog signals defining the luminance (Y) and the colour difference (R−Y) and (B−Y), ie chrominance, of the picture elements. More recently digital signals have been used to represent television pictures. Digital signals are highly resistant to degradation and can be readily processed to create special effects in the television picture.

In one digital standard, the so-called D1 standard, a component signal is used consisting of luminance (Y) and chrominance (U, V) signals that are sampled at a ratio of 4:2:2. The luminance signal is sampled at a rate of 13.5 MHz and the two chrominance signals are each sampled at a rate of 6.75 MHz. The bandwidth is a measure of the detail in the picture. Sampling in the 4:2:2 ratio means that the horizontal resolution of the colour in the television picture is halved, but because it is the luminance that contains the picture detail this reduction in horizontal colour resolution is an acceptable compromise that enables the data rate to be reduced.

As a component signal, the D1 signal is well suited to studio and post-production work. However, under some circumstances unacceptable image degradation can occur as a direct consequence of the reduced chrominance bandwidth. FIG. 1 of the accompanying drawings illustrates a simple picture 1 comprising two areas of different colours 2, 3, say yellow and black, with an abrupt transition 4 between the two areas. FIG. 2 of the accompanying drawings shows a signal 5 of infinite bandwidth representing a line 6 in the picture 1. The infinite bandwidth of the signal 5 means that signal can represent exactly the transition 4 between the two areas 2, 3. Ideally, the luminance (Y) and chrominance (U, V) signals would represent the line 6 in this manner. However, this does not happen in practice because of the limited bandwidth of the signals. FIG. 3 of the accompanying drawings shows a luminance signal 7 comprising multiple sample values at evenly spaced intervals. The effect of limiting the bandwidth in the signal 7 is to produce a transitional zone 9 in the signal extending to each side of the boundary 4 in the picture. FIG. 4 of the accompanying drawings shows a signal 10 having half the bandwidth of the signal 7 and corresponding to one of the chrominance signals (U or B). The effect of halving the bandwidth of the signal 10 as compared to that of the signal 7 is to halve the number of sampling points 11 that comprise the signal 10 and to increase the size of the transitional zone 12 on each side of the boundary 4 in the picture.

When the picture represented by the luminance signal 7 and chrominance signals 10 is displayed on a monitor the boundary 4 between the two areas 2, 3 will not be seen as a sharp line but will instead be seen as a blurred region that may contain unwanted colours between yellow and black. In some situations, especially when the image is static as opposed to part of a video sequence, this blurring of the boundary 4 is unacceptable.

In British Patent Application No. 9607910.8, the teachings of which are incorporated herein by reference, there is described a processing system for converting the 4:2:2 signals into 4:4:4 signals. That is to say, the system converts the initial chrominance (UV) data that are shared between two adjacent pixels into respective chrominance (UV) data for each pixel. This overcomes the above-discussed problems and thus facilitates processing of the signals.

Naturally, once the 4:4:4 signals have been processed it is necessary to convert them back into the 4:2:2 format so that they can be stored in D1 equipment and/or broadcast. Many television companies insist that there should be no difference between the initial 4:2:2 signals and the 4:2:2 signals that have been processed. Of course there will be some differences where the pixel values have been intentionally changed as part of the processing, but the differences must be limited to such intentional changed and it is impermissible to create differences that are solely as a result of converting from 4:2:2 into another format and back again.

The invention addresses these problems.

According to one aspect of the invention there is provided a signal processing apparatus comprising: a source of a plurality of video signals that each contain an equal amount of data for a given pixel in a video image; a first filter for filtering the plurality of video signals to produce first filtered signals; a second filter for filtering the plurality of video signals to produce second filtered signals; a selector connected to the first and second filters for selecting between portions of the first and second filtered signals, and thereby outputting a plurality of video signals in which at least one of the signals contains less data for a given pixel in a video image than at least one other of the signals.

According to another aspect of the invention there is provided a signal processing method comprising: filtering a plurality of video signals that each contain an equal amount of data for a given pixel in a video image to produce first filtered signals; filtering the plurality of video signals to produce second filtered signals; selecting between portions of the first and second filtered signals; and outputting a plurality of video signals in which at least one of the signals contains less data for a given pixel in a video image than at least one other of the signals.

The invention also provides a signal processing system in which initial signals in one standard comprising plural signals of equal bandwidth are converted into resultant signals in another standard comprising plural signals of differing bandwidths by processing the initial signals to produce processed signals and selecting portions of the initial signals or of the processed signals for output as the resultant signals depending on a comparison between the processed signals and the initial signals.

The above and further features of the invention are set forth with particularity in the appended claims and together with advantages thereof will become clearer from consideration of the following detailed description of exemplary embodiments of the invention given with reference to the accompanying drawings.

Figure 1:
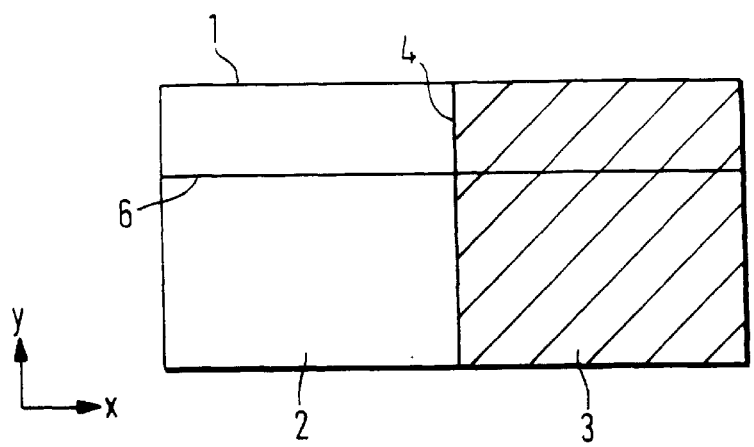
FIG. 1 illustrates a simple picture comprising two areas of different colours, as already described herein.
Figure 2:
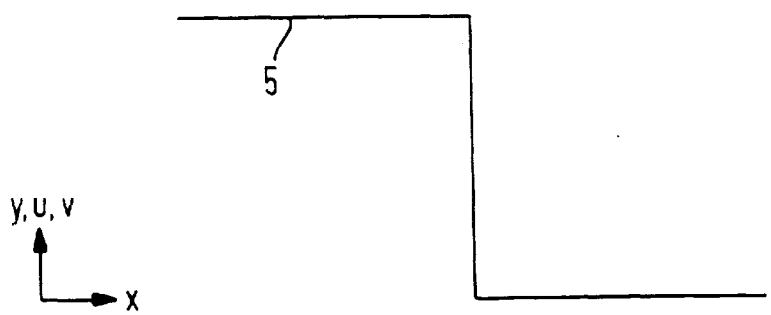
FIG. 2 shows a signal of infinite bandwidth representing a line in the picture of FIG. 1, as already described herein.
Figure 3:
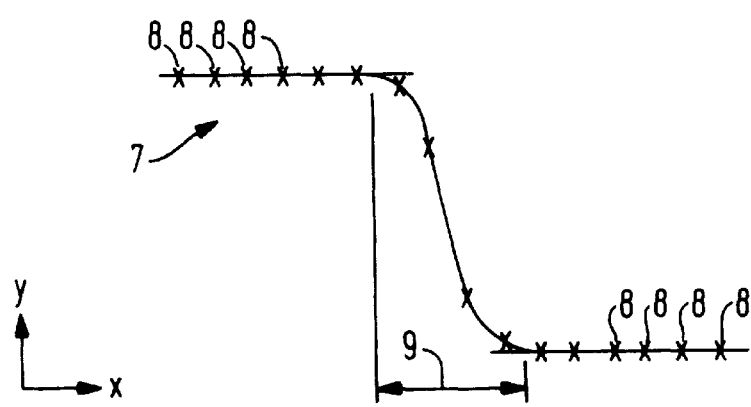
FIG. 3 shows a signal of finite bandwidth representing luminance of the line in FIG. 1, as already described herein.
Figure 4:
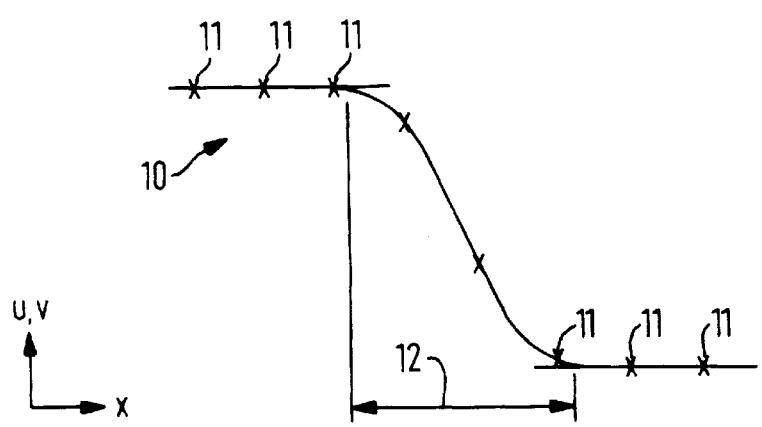
FIG. 4 shows a signal of reduced finite bandwidth representing the line in FIG. 1, as already described herein.
Figure 5:
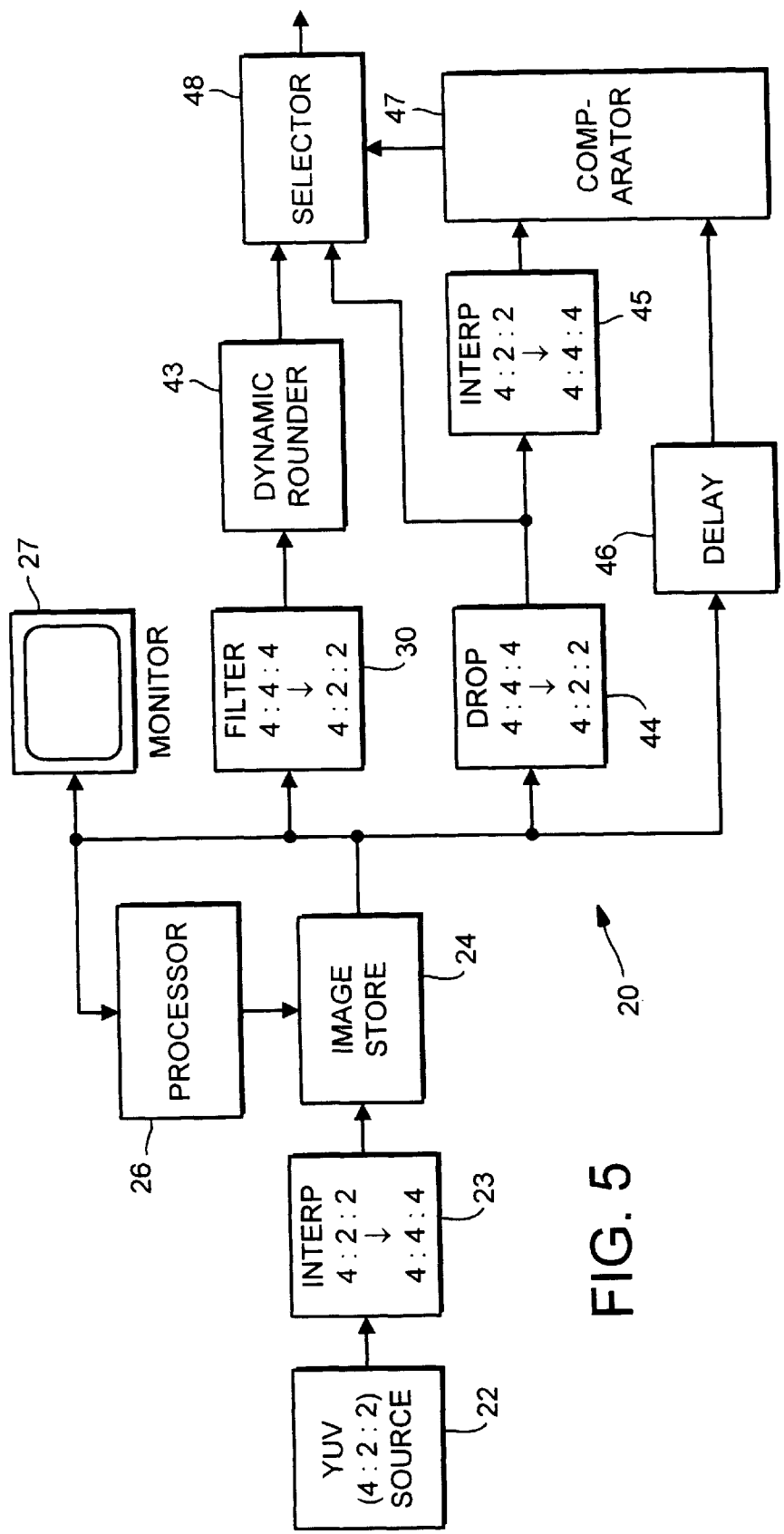
FIG. 5 is a schematic functional block diagram of a system embodying the invention.

Turning to FIG. 5 of the accompanying drawings there is shown an image processing system 20 comprising a source 22 of image signals defining a multiplicity of pixels that together form an image or a series of images (frames) that constitute a video sequence.

Each pixel (pixel 0, pixel 1, pixel 2, etc.) has luminance data ($Y_0$, $Y_1$, $Y_2$, etc.) associated with it. Every other pixel (pixel 0, pixel 2, pixel 4, etc.) has chrominance data ($U_0$, $V_0$, $U_2$, $V_2$, $U_4$, $V_4$, etc.) associated with it. The chrominance data is shared between two pixels (e.g. pixel 0 and pixel 1) as already described herein above.

The source 22 is connected to supply signals to an interpolator 23 which converts the 4:2:2 signals to signals in YUV 4:4:4 format. The interpolator 23 is essentially the same as described in our above mentioned British patent application No. 9607910.8. Signals from the interpolator 23 are input to an image store 24 for processing by a processor 26. The processor 26 may be of the kind described in our British patent Nos. 2089625 and 2113950 so as to enable a user of the system to "paint" new details into or combine portions of other pictures with the image represented by the data in the image store 24. The system 20 also includes a monitor 27 connected to the image store 24 to enable the user to view the effect of the processing of the image data in the store 24.

The source 22 will typically comprise a video tape recorder (VTR) or the like capable of supplying signals representing a multiplicity of video frames which together form a video sequence. The system 20 is therefore able to process selected frames or every frame of a video clip by supplying the signals representing frames a frame at a time to the image store 22 via the interpolator 23.

Once the user is satisfied with the processing of a frame (or if he decided not to process that particular frame) the data from the image store 24 is output to a filter 30 which filters the signal to convert the signals back into the YUV 4:2:2 format by interpolation.

Figure 6:
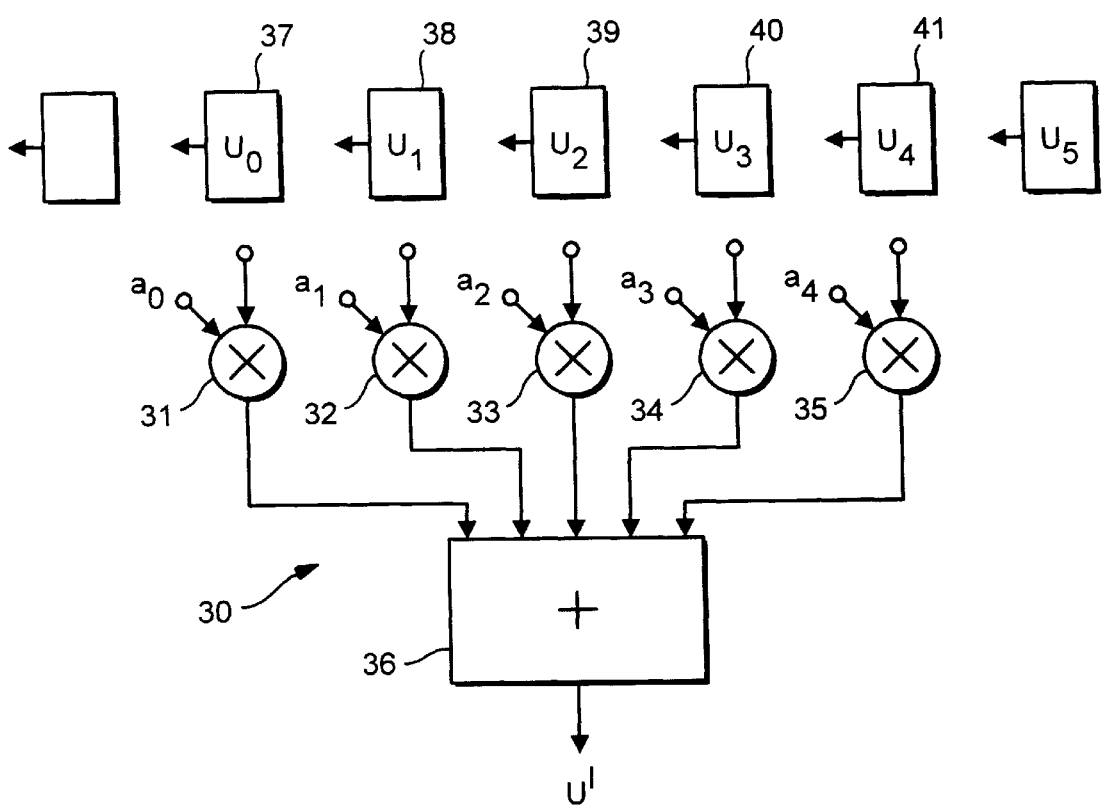
FIG. 6 is a schematic diagram of a filter.

The filter 30 is shown in greater detail in FIG. 6 of the accompanying drawings. As shown therein the filter 30 is a finite impulse response filter comprising a number (say five) of multipliers 31 to 35 whose outputs are connected to an adder 36. Each multiplier is connected to receive a respective chrominance value 37 to 41 from the image store 24 (see FIG. 5) and a respective weighting parameter ($a_0$ to $a_4$) from a parameter store (not shown). The filter 30 is arranged to weight each of the input chrominance values $U_i$ with a respective weighting parameter $a_i$, and then to sum all of the weighted chrominance values. In other words the filter produces an output chrominance value U' in accordance with the equation $$U'_j = \sum_{i=j-2}^{i=j+2} a_i U_i$$

Thus, the filter 30 weighted summation of chrominance values for pixels centred about the pixel of interest in order to obtain a chrominance value $U_j'$ for the jth pixel of interest. The weighting parameters determine how much contribution the input chrominance values 37 to 41 make to the output chrominance value $U_j'$. It will be appreciated the precise values of $a_0$ to $a_4$ are not significant but we have found that values of $2/16$, $3/16$, $6/16$, $3/16$, $2/16$ for $a_0$, $a_1$, $a_2$, $a_3$, $a_4$ give a satisfactory result.

The purpose of the filter 30 is to convert Y,U,V signals in the 4:4:4 format into corresponding signals in the 4:2:2 format. Therefore, only every other chrominance value is of the interest. When the filter 30 has performed the above described filtering operation to produce a chrominance value for, say, $U_2'$ the input chrominance values 37 to 41 are shifted two places to the left (as shown in FIG. 6) and the operation is then performed again on input chrominance values $U_2$, $U_3$, $U_4$, $U_5$, $U_6$ in order to produce the chrominance value $U_4'$.

Although FIG. 6 shows the filter operating on U chrominance values, it will be appreciated that the filter also performs an equivalent operation on V chrominance values. The filter may be arranged to produce a U chrominance value in a first time period and then to produce a V chrominance value in the next time period. Alternatively, the filter may comprise a second array of multipliers and an associated second adder (not shown) arranged to operate on the V chrominance values in parallel with the elements of the filter shown in FIG. 6. Usually, a single filter operating alternatively on U and V chrominance values will produce the 4:2:2 data at a satisfactory rate. The luminance (Y) signal passes through the filter 30 unaltered. A filter other than a finite impulse response filter may be used if desired.

Filtering of the data can introduce rounding errors. In order to avoid the problems that can result from rounding errors, such as aliasing (jagged diagonal lines in the image), the filter 30 is connected to a dynamic rounding circuit 43. The dynamic rounder 43 serves to randomise the changing of signal values between one digital value and the next, thereby avoiding aliasing. The dynamic rounder 43 may be of the kind described in our European Patent No. 270259 and corresponding U.S. Pat. No. 5,175,807, the teachings of which are incorporated herein by reference.

Referring to FIG. 5, the signals from the image store 24 are also supplied to a coarse filter 44 arranged to convert the 4:4:4 format signals into 4:2:2 format signals simply by passing U and V values for every other pixel only. This may be achieved simply by the filter 44 switching its output on for periods of time when the input signal is to be output and switching the output off when the input signal is not required to be output. The drop filtered 4:2:2 signals are then input to an interpolator 45 where they are again converted into the 4:4:4 format. Thus the interpolator 45 performs exactly the same function as the interpolator 23. As a matter of practical convenience the interpolators 23 and 45 may comprise the same unit suitably switched to receive the appropriate signals at the appropriate time. The interpolators 23, 45 are shown as separate units in the drawing in order to facilitate a better understanding of the system 20.

If pixels have been altered during processing by the processor 26 then the operation of dropping UV data for every other pixel and then converting that data back into the 4:4:4 format will result in the YUV signals output from the interpolator 45 being different than the YUV signals output from the converter 28. Conversely if the signals have not been altered by the processor 26, dropping the UV data for every other pixel will convert the signals back into their original form (i.e. as they were supplied by the source 22). This is because the interpolator 23 does not modify the original data in the signals, it merely adds to that data. It is only when the data is processed that a change from the original will occur.

The purpose of converting from 4:4:4 to 4:2:2 format by dropping pixels and then converting back to 4:4:4 format is to enable processed pixels to be identified before the YUV signals are output from storage. The converted signals output from the converter 28 are also input to delay circuit 46 which introduces to the signals a delay equal to the time taken for the signals to be processed by both the drop filter 44 and the interpolator 45. Equivalent signals are therefore output in synchronism by both the interpolator 45 and the delay circuit 46. The two signals are input to a comparator 47 where they are compared with each other.

The filtered 4:2:2 signal from the filter 30 an the drop-filtered 4:2:2 signals from the drop filter 44 are both supplied to a selector 48. The comparator 47 is connected to control the selector 48 depending on whether or not there is a difference between the 4:4:4 signals output from the converter 28 via the delay circuit 46 and the 4:4:4 signals output via the interpolator 45. If there is a difference, the comparator 47 causes the selector 48 to select the filtered 4:2:2 signals output from the filter 30. If there is no difference the selector 48 is caused to select the drop-filtered 4:2:2 signals from the drop filter 44. This approach ensures that the signal output from the selector 48 comprises wherever possible the original unprocessed 4:2:2 signals (from the drop filter 44) and only contains processed signals (from the store 24) when the pixels to which those signals pertain have been modified in some way by the processor 26.

Together the filter 30, the drop filter 44, the interpolator 45, the comparator 47 and the selector 48 cooperate to convert the 4:4:4 signal, developed from an initial 4:2:2 signal and in which at least some of the pixels have been processed, into an output 4:2:2 signal comprising unprocessed pixels equal to the pixels in the initial 4:2:2 signal and processed pixels derived from processed pixels in the 4:4:4 signal. This ensures that wherever possible the 4:2:2 signal output from the system 20 is the same as the 4:2:2 signal initially input to the system and only deviates from the initial signal for pixels that have been processed by the processor 26 while in the 4:4:4 format. In other words, apart from processed pixels, the system 20 is transparent in that the output 4:2:2 signal is identical to the initially input 4:2:2 signal. This is as close as it is possible to get to processing the 4:2:2 signal without affecting the signal. Processing inevitably has an affect (otherwise there would effectively be no processing) but this approach ensures that the affect of the processing is limited to only those pixels that were desired to be changed by the processing.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. A signal processing apparatus comprising:
   a source of a plurality of selectively processed video signals that each contain an equal amount of data for a given pixel in a video image;
   a first filter for filtering the plurality of video signals to produce first filtered signals;
   a second filter for filtering the plurality of video signals to produce second filtered signals;
   a third filter connected to the second filter for reconverting the second filtered signals into a set of plural video signals that each contain an equal amount of data for a given pixel;
   a comparator for comparing the plurality of video signals from the source with the set of plural video signals from the third filter; and
   a selector connected to the first and second filters for selecting between portions of the first and second filtered signals, the selector being controlled by the comparator depending on the result of the comparison to output a plurality of video signals in which at least one of the signals contains less data for a given pixel in a video image than at least one other of the signals.

2. A signal processing apparatus as claimed in claim 1, wherein the first filter comprises an interpolator.

3. A signal processing apparatus as claimed in claim 1, wherein the first filter comprises a finite impulse response filter.

4. A signal processing apparatus as claimed in claim 1, wherein the second filter comprises a switch for preventing passage of portions of the at least one signal.

5. A signal processing apparatus as claimed in claim 1, wherein the comparator is arranged to cause selection of portions of the first filtered signals when there is a difference between the plurality of video signals and the set of plural video signals and to cause selection of portions of the second filtered signals when there is no difference between the plurality of video signals and the set of plural video signals.

6. A signal processing system as claimed in claim 1, further comprising a dynamic rounding circuit for overcoming any aliasing effects in the image represented by the plurality of video signals output from the first filter.

7. A signal processing system as claimed in claim 1, wherein the source comprises a processor for processing the plurality of video signals so as to manipulate the image represented thereby.

8. A signal processing system as claimed in claim 7, wherein the source comprises a converter for converting a plurality of initial video signals in which at least one of the initial signals contains less data for a given pixel into the plurality of video signals that each contain an equal amount of data for a given pixel.

9. A signal processing apparatus as claimed in claim 7, further comprising a store for storing the signals from the source for processing by the processor.

10. A signal processing method comprising:
    filtering a plurality of selectively processed video signals that each contain an equal amount of data for a given pixel in a video image to produce first filtered signals;
    filtering the plurality of video signals to produce second filtered signals;
    reconverting the second filtered signals into a set of plural video signals that each contain an equal amount of data for a given pixel;
    comparing the plurality of video signals with the reconverted set of plural video signals;
    selecting between portions of the first and second filtered signals depending on the result of the comparison; and
    outputting a plurality of video signals in which at least one of the signals contains less data for a given pixel in a video image than at least one other of the signals.

11. A signal processing method as claimed in claim 10, wherein the first filtered signals are produced by interpolation.

12. A signal processing apparatus as claimed in claim 10, wherein the second filtered signals are produced by preventing passage of portions of the at least one signal.

13. A signal processing method as claimed in claim 10, wherein the portions of the first filtered signals are selected when there is a difference between the plurality of video signals and the reconverted set of plural video signals; and
    the portions of the second filtered signals are selected when there is no difference between the plurality of video signals and the reconverted set of plural video signals.

14. A signal processing method as claimed in claim 10, further comprising a dynamically rounding the first filtered signals.

15. A signal processing method as claimed in claim 10, wherein the plurality of video signals are processed so as to manipulate the image represented thereby.

* * * * *